US010534720B2

(12) United States Patent
Shih et al.

(10) Patent No.: US 10,534,720 B2
(45) Date of Patent: Jan. 14, 2020

(54) APPLICATION AWARE MEMORY RESOURCE MANAGEMENT

(71) Applicant: VMware, Inc., Palo Alto, CA (US)

(72) Inventors: Chiao-Chuan Shih, San Jose, CA (US); Samdeep Nayak, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 15/166,131

(22) Filed: May 26, 2016

(65) Prior Publication Data

US 2017/0344298 A1 Nov. 30, 2017

(51) Int. Cl.
*G06F 12/109* (2016.01)
*G06F 12/123* (2016.01)
*G06F 12/12* (2016.01)

(52) U.S. Cl.
CPC ............ *G06F 12/109* (2013.01); *G06F 12/12* (2013.01); *G06F 12/123* (2013.01)

(58) Field of Classification Search
CPC .... G06F 3/0604; G06F 3/0631; G06F 3/0644; G06F 3/0665; G06F 3/0683; G06F 12/109; G06F 12/12; G06F 12/123; G06F 2212/1041; G06F 2212/69
See application file for complete search history.

(56) References Cited

U.S. PATENT DOCUMENTS

| | | | | |
|---|---|---|---|---|
| 2011/0154104 A1* | 6/2011 | Swanson | ............. | G06F 11/1666 711/162 |
| 2012/0011508 A1* | 1/2012 | Ahmad | ............... | G06F 12/1009 718/1 |
| 2012/0117298 A1* | 5/2012 | Scannell | ................. | G06F 12/08 711/6 |
| 2012/0209893 A1* | 8/2012 | Kim | .................. | G06F 17/30129 707/822 |
| 2015/0309940 A1* | 10/2015 | Kumar | ................ | G06F 12/1009 345/506 |
| 2016/0054922 A1* | 2/2016 | Awasthi | ................ | G06F 3/0631 711/103 |

* cited by examiner

*Primary Examiner* — Aracelis Ruiz
(74) *Attorney, Agent, or Firm* — Fountainhead Law Group PC

(57) ABSTRACT

Memory management in a computer system may include allocating memory pages from a physical memory of the computer system to applications executing on the computer system. The memory pages may be associated with memory management tags. One or more memory pages may be identified for processing from the physical memory based on the memory management tags that the memory pages are associated with. The processed memory pages may then be designated as un-allocated memory pages for subsequent allocation to applications executing on the computing system.

17 Claims, 11 Drawing Sheets

APPLICATION AWARE MEMORY RESOURCE MANAGEMENT

BACKGROUND

A virtual machine is a software implementation of a physical computer that, like an actual physical computer, runs an operating system (sometimes referred to as guest operating system, guest OS) and applications. Each virtual machine has access to virtual, or software-based, hardware, including a virtual CPU, memory, hard disk, and network interface card. Software called the hypervisor is installed on the physical hardware in a virtualized system, and acts as a platform for virtual machines.

The hypervisor provides a platform for running virtual machines and allows for the consolidation of the platform's physical computing resources. The hypervisor provides software representations of physical hardware resources dynamically to virtual machines as needed to support operation of the virtual machines. The hypervisor allows virtual machines to operate with a degree of independence from the underlying physical hardware. For example, a virtual machine can be moved from one physical host to another (sometimes referred to a virtual machine migration) or its virtual disks can be moved from one type of storage to another (sometimes referred to as virtual storage migration), without affecting the functioning of the virtual machine.

The hypervisor manages its physical memory (sometimes referred to as host physical memory) so that each virtual machine can transparently access the "physical" memory the virtual machine is configured with (sometimes referred to as guest physical memory). Since the physical host machine on which the hypervisor runs has limited physical memory, the hypervisor can be challenged when the total memory consumption of deployed virtual machines exceeds the capacity of physical memory.

SUMMARY

In accordance with aspects of the present disclosure, a method for virtual memory management in a computer system may include allocating memory pages from a physical memory of the computer system to applications executing on the computer system and associating the allocated memory pages with memory management tags. The memory management tags may include memory management tags of a first kind and memory management tags of a second kind. The method may include identifying one or more memory pages to be evicted from the physical memory based on whether the memory pages are associated with a memory management tag of the first kind or a memory management tag of the second kind, and evicting the identified memory pages. The evicted memory pages may be designated as un-allocated memory pages for subsequent allocation to applications executing on the computing system.

In some embodiments, the method may further include selecting a memory management tag of the first kind or the second kind in response to the computer system receiving an I/O command from an application executing on the computer system and associating memory pages allocated to the application with the selected memory management tag.

In some embodiments, the memory pages associated with memory management tags of the $1^{st}$ kind are evicted only after all memory pages associated with memory management tags of the $2^{nd}$ kind have been evicted.

In some embodiments, the computer system may be a host machine in a virtualization system. The memory pages that comprise the physical memory may be allocated to virtual machines deployed on the host machine. The method may further include transferring a virtual machine deployed on the host machine to a destination host machine by copying, from the host machine to the destination host machine, data that is stored only in memory pages allocated to the virtual machine that are not associated with memory management tags of the $2^{nd}$ kind and designating all memory pages allocated to the virtual machine as un-allocated memory pages for subsequent allocation to other virtual machines deployed on the host machine.

In accordance with aspects of the present disclosure, a non-transitory computer-readable storage medium may have stored thereon instructions for controlling a computer system to allocate memory pages from a physical memory of the computer system to applications executing on the computer system and associate the allocated memory pages with memory management tags. The memory management tags may include memory management tags of a first kind and memory management tags of a second kind. The computer system may further be caused to identify one or more memory pages to be evicted from the physical memory based on whether the memory pages are associated with a memory management tag of the first kind or a memory management tag of the second kind and evict the identified memory pages. The evicted memory pages may be designated as un-allocated memory pages for subsequent allocation to applications executing on the computing system.

In accordance with aspects of the present disclosure, a computer system may include a data processing component, a physical memory organized into a plurality of memory pages, and local data storage. The local data store may have stored thereon computer executable program code, which when executed by the data processing component causes the data processing component to allocate memory pages from a physical memory of the computer system to applications executing on the computer system and associate the allocated memory pages with memory management tags. The memory management tags may include memory management tags of a first kind and memory management tags of a second kind. The computer system may further be caused to identify one or more memory pages to be evicted from the physical memory based on whether the memory pages are associated with a memory management tag of the first kind or a memory management tag of the second kind and evict the identified memory pages. The evicted memory pages may be designated as un-allocated memory pages for subsequent allocation to applications executing on the computing system.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
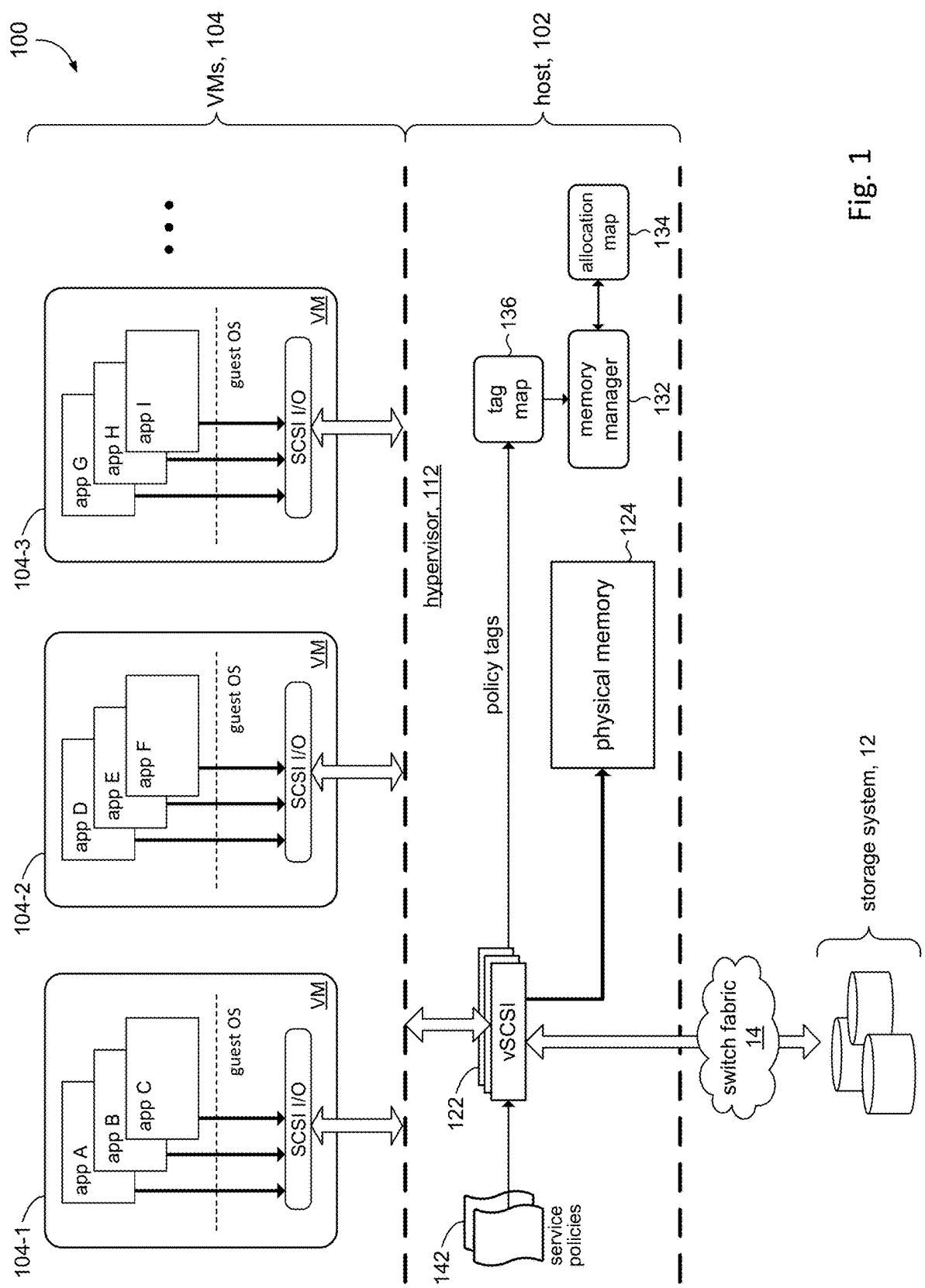
FIG. 1 shows a high level block diagram of a virtual machine environment in accordance with the present disclosure.

FIG. 1 shows a computer system 100 in accordance with the present disclosure. In some embodiments, the computer system 100 may be configured to provide and support virtualization (a virtualization system). The computer system 100 may include a host machine (virtualization host) 102 configured to operate a hypervisor 112 (or virtual machine monitor, VMM). The hypervisor 112 may comprise computer software, firmware, and/or hardware to create and deploy (power up, run, execute) virtual machines (VMs) 104 and to support the execution of VMs 104. For example, the VMware® ESX® hypervisor is a commercial virtualization platform that can execute on any suitable computer hardware to configure, deploy, and support the execution of VMs 104.

Each VM 104-1, 104-2, 104-3 may execute a guest operating system (guest OS), and the guest OS, in turn, may support execution of one or more applications (e.g., app A, app B, app C running on VM 104-1). The "physical" memory of a VM 104 (sometimes referred to as "guest physical memory") may be allocated from a physical memory 124 of the host machine 102 (sometimes referred to as "host physical memory"). The guest OS executing on the VM 104, in turn, may define a virtual address space (sometimes referred to as "guest virtual memory") for its applications. The guest OS may translate memory reads and writes to the guest virtual memory into memory reads and writes to the guest physical memory. The hypervisor 112, in turn, may translate memory reads and writes to the guest virtual memory into memory reads and writes to the physical memory 124 of the host machine 102. A VM 104 may be configured with a given amount of memory, for example, 512 GB. However, at any given moment, the hypervisor 112 may allocate only a percentage of the configured memory (e.g., in units of memory pages) to the VM 104, since not all of the configured memory will be actively accessed by the VM 104.

The computer system 100 may access a data storage system 12 to support the data storage needs of VMs 104 deployed on the host machine 102; e.g., a file system. The data storage system 12 may also support data storage needs of the host machine 102 itself. The data storage system 12 may comprise any suitable configuration of physical devices, including, for example, individual storage disks, arrays of storage disks, and so on. In various embodiments, the data storage system 12 may be based on any suitable storage architecture, such as for example, storage area network (SAN) arrays such as fibre channel SAN arrays and iSCSI SAN arrays, Virtual Volume arrays, network attached storage (NAS) arrays, and the like. Access to the data storage system 12 may be made over a switching fabric 14, or any other suitable public and/or private data communication network.

In some embodiments, the guest OS in each VM 104 may be configured to access data storage devices using the small computer system interface (SCSI) standard. For example, each guest OS may be configured with a SCSI I/O interface for data I/O with one or more SCSI devices. The hypervisor 112 may deploy one or more vSCSI instances 122 (e.g., a virtual SCSI device) to support SCSI-based data I/O for each VM 104-1, 104-2, 104-3. This aspect of the present disclosure is discussed further below.

The hypervisor 112 may include a memory manager component 132. The memory manager 132 may be configured to manage the physical memory 124 to support VMs 104 executing on the host machine 124. For example, the memory manager 132 may allocate portions of physical memory 124 to a VM 104 when it is deployed, and de-allocate or otherwise free the allocated portions of physical memory when the VM 104 is powered down, or when the VM 104 is migrated to another host machine. The memory manager 132 may be configured to manage physical memory 124 in units generally referred to as a "memory page." A memory page may be any suitable size (e.g., 4 KB, 32 KB, etc.).

The memory manager 132 may perform operations on the physical memory 124, such as page swapping of memory pages allocated to deployed VMs 104 in order to accommodate the several VMs 104 that may be deployed on the host machine 102. For example, unused memory pages allocated to a VM may be swapped out in order to allow the memory pages to be allocated to other VMs. When a VM accesses memory in a swapped out memory page, the memory manager 132 may swap the memory page back in. The memory manager 132 may perform memory "transfers" to support the migration of a VM (e.g., 104-1) from one host machine (e.g., 102) to a different host machine (destination host machine, not shown). For example, VMware, Inc. a provider of virtualization systems, refers to this functionality in their systems as vMotion™ migration.

In accordance with some embodiments, the hypervisor 112 may include an allocation map 134 and a tag map 136 to support the operations of the memory manager 132. The allocation map 134 may indicate which memory pages are allocated to a VM 104. In accordance with embodiments of the present disclosure, policy tags may be stored in the tag map 136 to support the operations of the memory manager 132. The vSCSI instances 122 may read in a policy 142 that corresponds to the VM 104 to produce the policy tags. These aspects of the present disclosure are discussed in more detail below.

Figure 2:
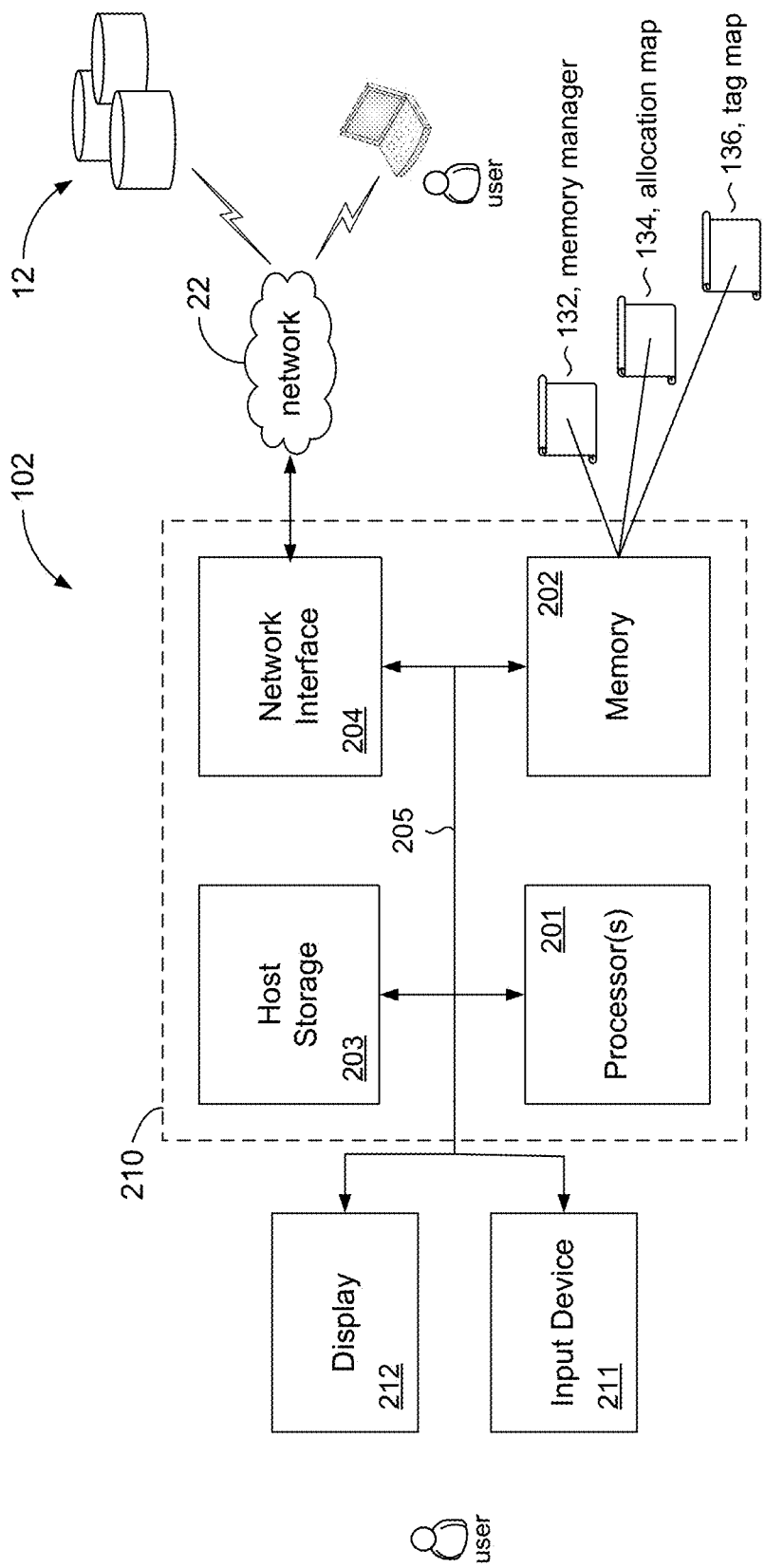
FIG. 2 shows a high level block diagram of a host computer system (host machine) configured in accordance with the present disclosure.

Refer now to FIG. 2 for a brief description of an illustrative implementation of host machine 102 in accordance with some embodiments of the present disclosure. The host machine 102 may include a computer 210 connected to I/O devices, such as display 212 and suitable input device(s) 211 such as a keyboard, a mouse, and so on to allow an administrative or other user to access the host machine 102 (e.g., for maintenance purposes). The computer 210 may include a processor component 201 that may comprise a single processor (e.g., central processing unit, CPU) or a configuration of many processors. A system bus 205 may provide control and/or data bus lines to interconnect the various components that comprise computer 210.

A memory component 202 may include any suitable random access memory (RAM) architecture such as dynamic RAM, static RAM (e.g., flash memory), and the like. The memory component 202 may constitute the physical memory 124 (FIG. 1) of host machine 102. The processor component 201 may use the memory component 202 to execute software components and store data that comprise the hypervisor 112, including the memory manager 132, the allocation map 134, and the tag map 136.

The host machine 102 may include a local (host) storage device component 203 to provide read/write-able data storage capability (e.g., hard disk drives) and/or read-only storage (e.g., CD discs). The storage device component 203 may store computer executable program code (e.g., memory manager 132 and other components of the hypervisor 112) which when executed by the processor component 201 cause the processor component 201 to perform various actions disclosed herein. The storage device component 203 may be used as a swap area for the memory manager 132.

The computer 210 may be connected to a network interface component 204 for communication over a network 22, such as a local network or a public access network. Users (e.g., system administrator) may access the host machine 102 locally via I/O devices 211, 212, or remotely via the network 22. The network 22 may include the switching fabric 14 (FIG. 1) for data communication with the data storage system 12.

Figure 3A:
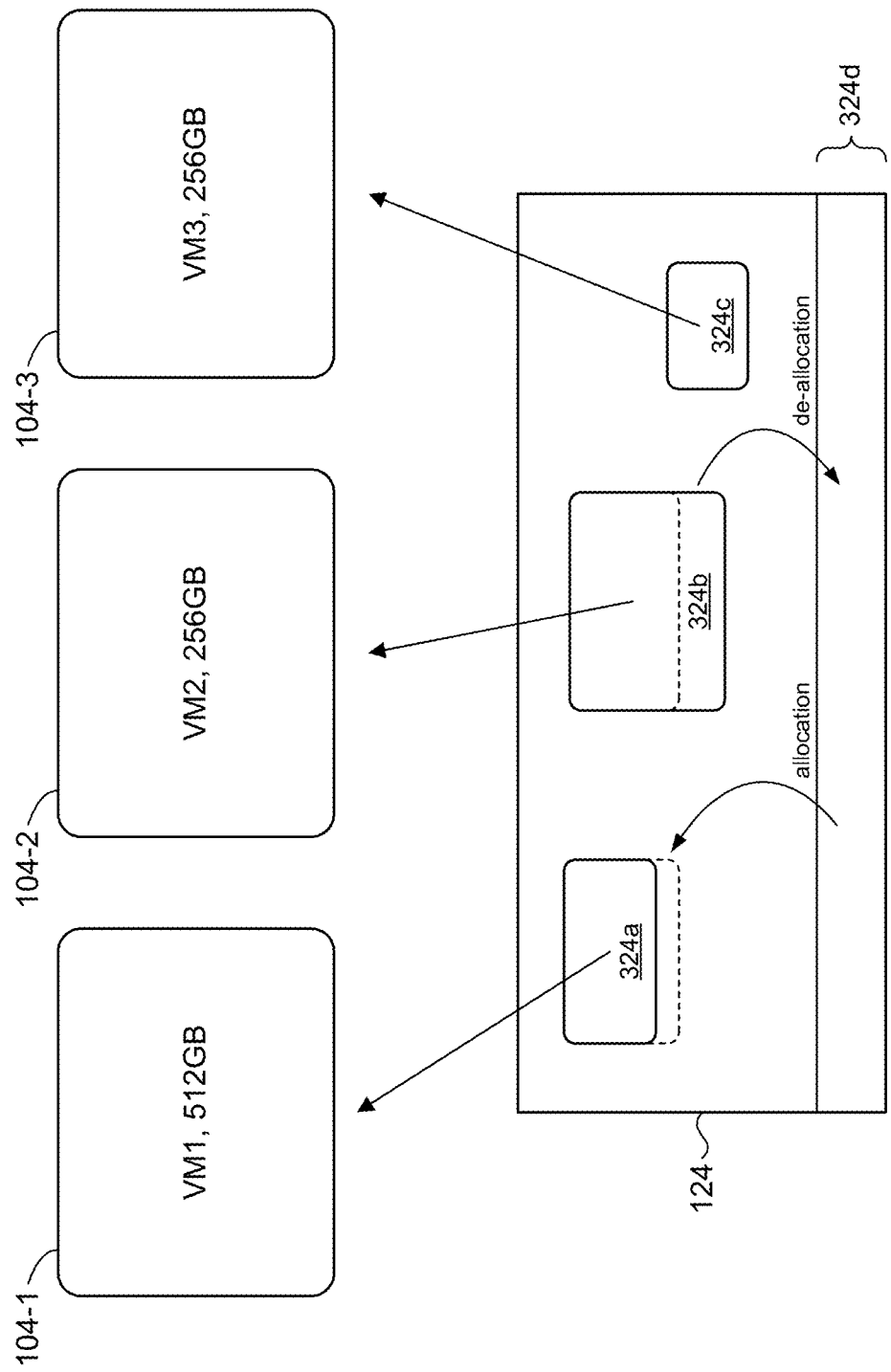
FIG. 3A illustrates an example of memory pages in a physical memory allocated to deployed virtual machines.

FIG. 3A is an abstract representation of how memory may be managed between the physical memory 124 in host machine 102 (FIG. 1) and VMs 104-1, 104-2, 104-3 deployed on the host machine 102. Merely for illustrative purposes, suppose the physical memory 124 comprises 512 GB of memory. Suppose further that VM1 is configured to have 512 GB of guest physical memory, VM2 is configured with 256 GB of guest physical memory, and VM3 is configured with 256 GB of guest physical memory. Since the physical memory 124 is limited and since VMs only access a percentage of their configured memory at any one time, the VMs 104 typically are not allocated their full configuration of guest physical memory. Instead, the physical memory 124 may be logically partitioned into chunks of memory (sometimes referred to as memory pages) that are individually allocated to the VMs 104-1-104-3 on an as-needed basis. This allows the hypervisor 112 to over-commit its memory resources in order to support more VMs than there is actual physical memory for.

For example, FIG. 3A shows that some number of memory pages 324a (totaling less that 512 GB) is allocated to VM1, another number of memory pages 324b is allocated to VM2, and likewise memory pages 324c are allocated to VM3. If VM1 accesses a memory location (guest physical address) that does not have a corresponding memory page in physical memory 124 allocated to it, the hypervisor 112 can allocate an additional memory page to VM1.

A buffer 324d of un-allocated (free) memory pages may be maintained in the physical memory 124. As the buffer 324d is depleted and its size falls below a threshold level, memory pages may be de-allocated from deployed VMs by a process referred to as "eviction" in order to maintain a minimum size of the buffer 324d. FIG. 3A, for example, shows that the memory manager 132 may select memory pages 324b from VM2 may be evicted, thus decreasing the number of memory pages 324b allocated to VM2 and increasing the size of buffer 324d.

Figure 3B:
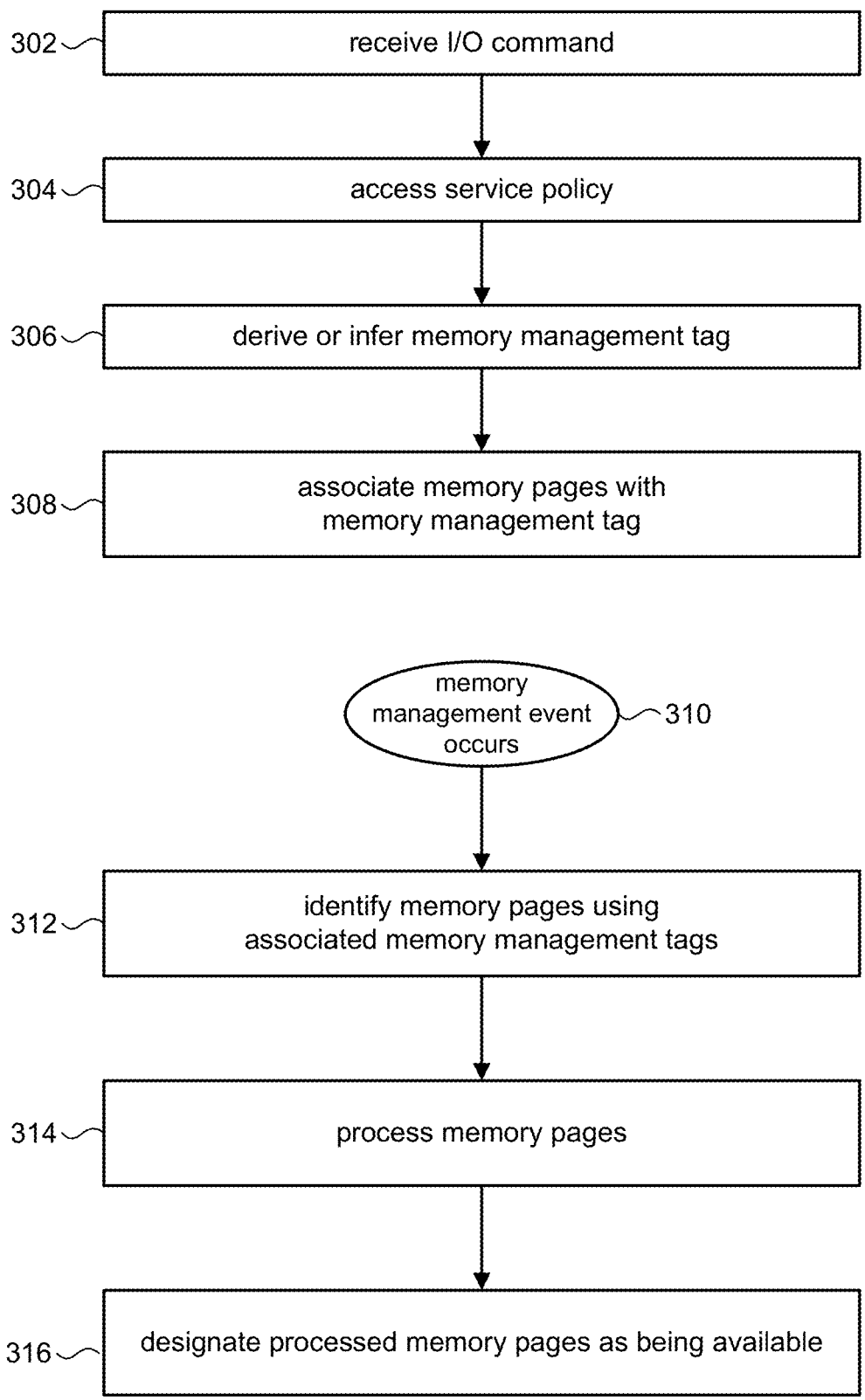
FIG. 3B highlights memory management processing in accordance with the present disclosure.

FIG. 3B is a high level representation of an aspect of processing in the hypervisor 112 to support the management of physical memory 124 in accordance with the present disclosure. At block 302, the hypervisor 112 may receive an I/O command from an application (e.g., app A, FIG. 1) executing on a deployed VM 104-1.

At block 304, the hypervisor 112 may access a service policy (e.g., 142, FIG. 1) associated with the VM that issued the I/O command. In some embodiments, for example, the service policy 142 may be accessed and processed by a vSCSI instance 122 associated with the VM. In some embodiments, a VM may have one or more associated service policies 142. A service policy 142 may specify certain performance levels or requirements accorded to the VM. For example, the service policy 142 may guarantee a minimum I/O latency for the VM, provide for data encryption, provide data compression, and so on. In accordance with the present disclosure, the service policy 142 may include information that characterizes the memory allocated to the VM. Merely to illustrate this point, for example, the service policy 142 might express that memory for the VM is "instant access" or "don't care," and so on.

In some embodiments, a service policy 142 may be associated with the VM. In other embodiments, a service policy 142 may be associated with particular applications that can execute on the VM. Accordingly, in some embodiments, the hypervisor may use information received with the I/O command to identify a service policy 142 that is associated with the VM. In other embodiments, the hypervisor may use information received with the I/O command that identifies the application that issued the I/O command to identify the service policy 142.

At block 306 the hypervisor 112 may use information in the service policy 142 to derive, infer or otherwise produce a memory management tag. For example, the service policy 142 may include a directive that requires memory to be "instant access," which can indicate that the memory pages for that VM (or for the corresponding application) should remain in the physical memory 124, thus allowing for instant access by application(s) on the VM. The service policy directive may identify memory as "don't care," which may indicate the memory pages can be swapped out, and so on with other service policy directives. In some embodiments, the hypervisor 112 may identify a memory management tag of a suitable kind based on the service policy. For example, a service policy 142 that specifies "instant access" may identify a memory management tag of a first kind, while a service policy 142 that specifies "don't care" may identify a memory management tag of a second kind, different from the first kind.

At block 308, the hypervisor 112 may associate (identify, tag) memory pages of the application with the memory management tag. In some embodiments, for example, memory pages may be tagged with memory management tags during processing of an I/O operation.

At block 310, a memory management event may arise. For example, the memory manager 132 may monitor the level of utilization of the physical memory 124 in terms of number of memory pages allocated to VMs 104 as a percentage of the total number of memory pages in the physical memory 124 used for VM allocation. If the utilization is above a predetermined utilization percentage, that may raise a memory management event, for example, indicating that available physical memory is "stressed." Conversely, a memory management event may be raised when the number of memory pages available for allocation is less than a predetermined threshold level. In some embodiments, the hypervisor 112 may be instructed to migrate a deployed VM (e.g., 104-1) to another host machine (not shown). In some embodiments, a VM migrate directive may be initiated by an administrator, or may be autonomously initiated. A VM migrate directive may be viewed as a memory management event.

At block 312, the hypervisor 112 may respond to the memory management event. For example, when the number of un-allocated memory pages falls bellows below a threshold level, that may raise a memory management event in order to increase the number of fee memory pages. Migrating a VM can raise a memory management event to copy and de-allocated memory pages. In accordance with the present disclosure, the memory manager 132 may use the memory tags to identify which memory pages to be processed in response to the memory management event.

At block 314, the hypervisor 112 may process the memory pages identified at block 312. In some embodiments, responding to a memory management event may involve evicting memory pages in order to make them available for allocation to other applications. Accordingly, the memory manager 132 may swap out (evict) the memory pages identified for eviction to free up those memory pages for allocation.

In other embodiments, a memory management event may involve processing memory pages for the purpose of migrating an executing VM to another (destination) host machine. When a VM is migrated to the destination host machine, the memory that is being used by the VM may be transferred to the destination host machine so that the migrated VM can continue executing on the destination host machine. In accordance with the present disclosure, some of the memory pages of the VM may not need be transferred to the destination host machine in order to lessen the burden of the data transfer. This aspect of the present disclosure is discussed in more detail below.

In some embodiments, block 312 may identify all the memory pages to be processed in block 314. In other embodiments, block 312 may identify one memory page to be processed in block 314. Processing between block 312 and 314 may repeat until enough memory pages have been processed.

At block 316, the hypervisor 112 may designate the processed memory pages as being available for subsequent allocation.

Figure 4:
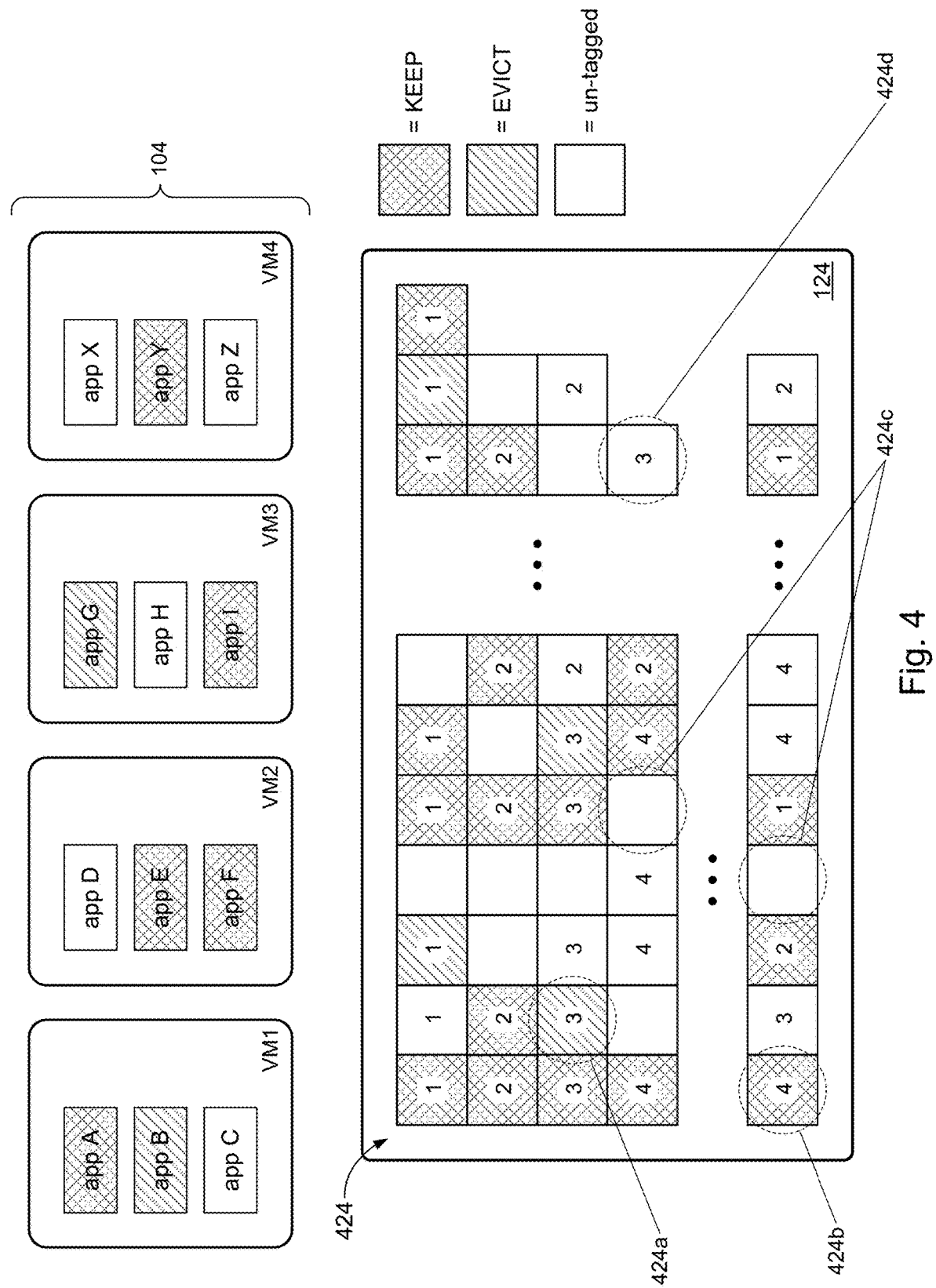
FIG. 4 is a pictorial representation of memory pages allocated to deployed virtual machines tagged in accordance with the present disclosure.

FIG. 4 is a pictorial representation of physical memory 124 and VMs 104 to illustrate an example of memory management tagging in accordance with the present disclosure. The example shows four deployed VMs VM1, VM2, VM3, VM4 and some memory pages 424 that comprise the physical memory 124. Memory pages 424 that have been allocated to a VM 104 are indicated with a number that identifies the VMs 104 to which they are allocated. For example, memory page 424a is allocated to VM3, memory page 424b is allocated to VM4, and so on. Un-allocated memory pages 424c are indicated by not having an identifying digit.

The memory pages 424 also indicate whether they are associated with a memory management tag or not. Memory pages 424 that are associated with a memory management tag are represented with a pattern or shading. For example, memory pages 424a, 424b are associated with a memory management tag, while memory page 424d is not associated with a memory management tag. Memory pages may be tagged with different kinds of memory management tags, as indicated in the figure by the use of different shading or patterns. FIG. 4 shows an example two different kinds of memory management tags, EVICT and KEEP. It will be appreciated that in other embodiments, other kinds of memory management tags may be defined.

The figure shows that different applications executing in a VM 104 may associate memory pages allocated to the VM with different kinds of memory management tags. For example, app A in VM1 may use memory management tags of a first kind (e.g., KEEP) and app B may use memory management tags of a second kind (e.g., EVICT).

FIG. 4 shows the use of two kinds of memory management tags, KEEP and EVICT. As explained below, in some embodiments, the memory management tag KEEP may be used to identify memory pages that should be kept in physical memory for as long a possible. On the other hand, the memory management tag EVICT may be used to identify memory pages that can be swapped out right away. It is noted that the semantics of the different kinds of memory management tags (e.g., EVICT, KEEP) may be different in other embodiments, and will depend on the particular way the memory management tags are used to manage the handling (e.g., eviction, migration) of memory pages.

Figure 5:
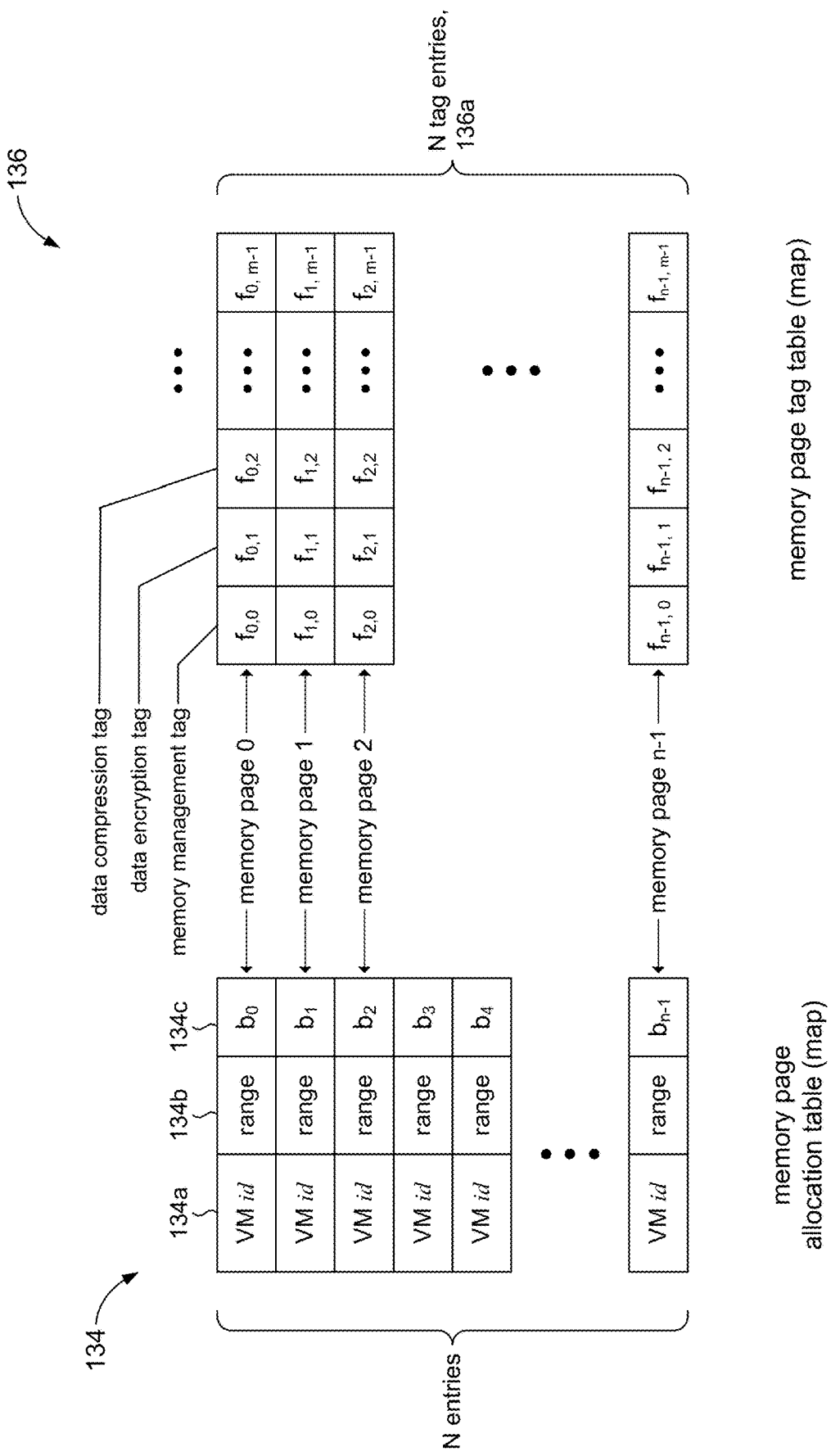
FIGS. 5A and 5B depict illustrative examples of tables for memory management in accordance with the present disclosure.

FIGS. 5A and 5B depict examples, respectively, of allocation map 134 and tag map 136 shown in FIG. 1. The maps 134, 136 are purely illustrative, intended only highlight information that may be used in accordance with the present disclosure. In some embodiments, for example, the allocation map 134 may be a data table having N entries, where N represents the number of memory pages in the physical memory 124 (FIG. 1). Each entry in the allocation map 134 corresponds to a memory page in physical memory 124, and may include a VM id field 134a that identifies the VM that the memory page is allocated to, an address range field 134b, and a bit field 134c that indicates whether the memory page is allocated (e.g., bit field is set) or un-allocated (e.g., bit field is cleared). The memory pages allocated to a VM are not likely to be contiguous memory pages in the physical memory 124; for example, the memory pages that constitute the guest physical memory of a VM may be scattered throughout the physical memory 124. Accordingly, the address range field 134b for a given memory page may represent the range of addresses in the guest physical memory that the given memory page represents. In some embodiments, for example, the information in the address range field 134b may be the starting address; the ending address can be computed by adding the size of the memory page to the starting address minus one.

The tag map 136 may be a data table having N tag entries 136a, where N represents the number of memory pages in the physical memory 124. Each tag entry 136a in the tag map 136 corresponds to a memory page in the physical memory 124. In accordance with some embodiments of the present disclosure, each tag entry 136a may comprise m tag fields that indicate different ways of processing the corresponding memory page. In some embodiments, for example, each tag entry 136a may include a data compression tag field to indicate whether or not data compression should be performed on the data when it is written back to the data storage system 12 (FIG. 1); the data compression tag field may indicate the type of data compression to perform. A data encryption tag field may indicate whether or not data encryption should be performed on the data stored in the corresponding memory page; the data encryption tag field may indicate the type of data encryption to use.

In accordance with the present disclosure, each tag entry 136a may include a memory management tag of a first kind (e.g., KEEP) or a second kind (e.g., EVICT). It will be appreciated that other kinds of memory management tags may be defined. This aspect of the present disclosure is explained in more detail below.

The present disclosure will now to turn to a description of managing memory pages in the hypervisor 112 (FIG. 1) in accordance with the present disclosure. Performance of the virtualization system can be impacted if the hypervisor 112 cannot deploy VMs, or provide physical memory in a timely manner for already deployed VMs. This can happen if the amount of free un-allocated memory pages in the physical memory 124 in the host machine 102 becomes too low. Accordingly, when the number of free un-allocated memory pages in the physical memory 124 is below a predetermined threshold (e.g., expressed as a percentage), a memory management event may arise. The memory manager 132 may respond to the memory management event. The memory manager 132 may evict (forced swap) memory pages that are allocated to deployed VMs in order to increase the number of free memory pages. Page eviction, however, can be disruptive to the VM whose memory pages have been evicted; e.g., performance may be degraded when the VM accesses an evicted memory page and must wait for the hypervisor 112 to reload the memory page.

In accordance with the present disclosure, the memory manager 132 can give preference to certain memory pages over other memory pages. For example, it may be desirable for the memory pages allocated to an in-memory database application (e.g., Hadoop Name Node) to remain in physical memory (allocated) for performance reasons. As another example, service agreements may be used to dictate minimum performance levels for certain applications, which may require that memory pages allocated to those applications remain in physical memory, and so on.

Figure 6:
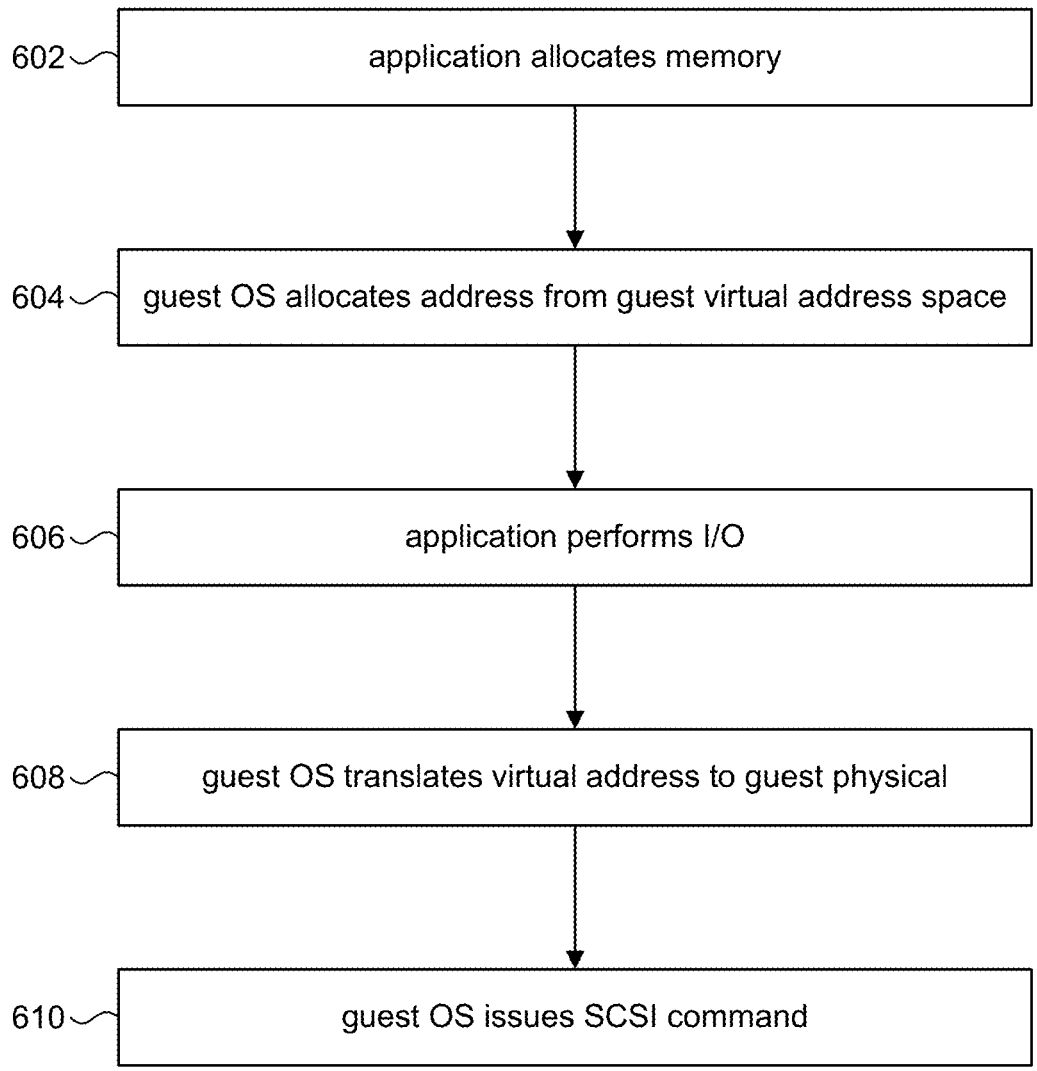
FIG. 6 highlights an example of an application providing a memory hint in accordance with the present disclosure.

FIG. 6 illustrates an example of I/O processing in the VM. At block 602, an application executing on a VM may allocate a block of memory from the guest virtual memory defined by the guest OS executing on the VM. Merely to illustrate, the application may make a system call (e.g., malloc( )) to allocate a block of guest virtual memory from the guest OS. The system call may include a size (e.g., in units of bytes) of the memory to be allocated.

At block 604, the guest OS may update some of its memory management tables (not shown) to indicate that a block of memory has been allocated. The guest OS may return a pointer (an address in the address space of the guest virtual memory) to the application.

At block 606, the application may make an application-level I/O function call, for example, to read in data from a file. For example, the application may make the following function call to the guest OS:

read (fd, buf_ptr, count)

where fd is a file descriptor of the file to read from, buf_ptr is the guest virtual address of the memory for where to store the data, and count indicates the amount of data to read in (e.g., in units of bytes).

At block 608, the guest OS may receive the I/O command and convert it to a corresponding SCSI I/O read command. This may include the guest OS translating the virtual address provided in the read( ) function call to a guest physical memory address. The guest OS may then construct a suitably formed SCSI I/O command (e.g., a SCSI CDB) that includes, among other relevant information, the guest physical memory address and a data count (which may be expressed in units of data blocks).

At block 610, the guest OS may issue the SCSI I/O command to a SCSI device interface. The SCSI I/O command, which includes the guest physical memory address, may then be received and processed by the hypervisor 112.

Figure 7:
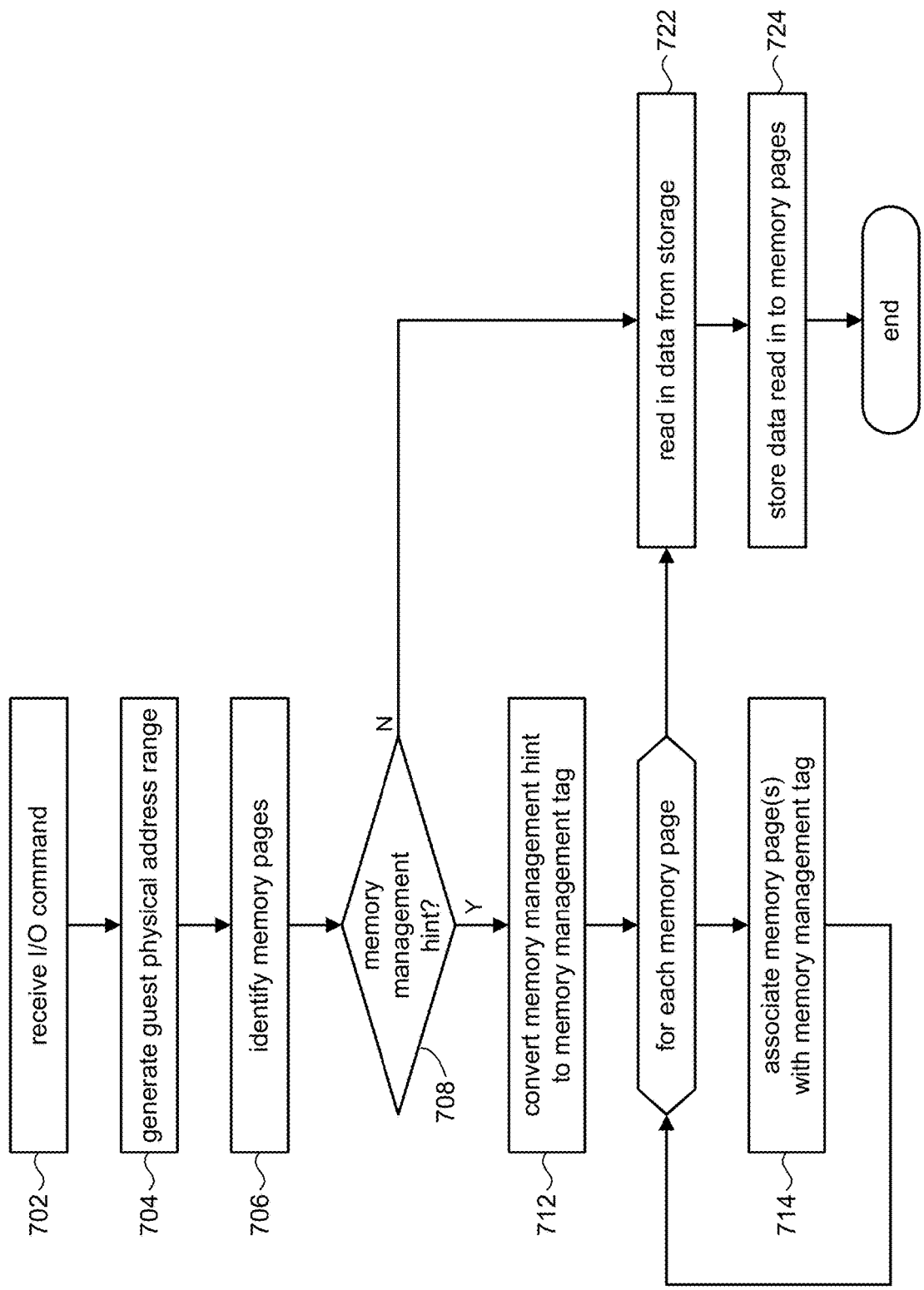
FIG. 7 highlights an example of processing memory management tags in accordance with the present disclosure.

Referring now to FIG. 7, processing of a SCSI I/O command by hypervisor 112 (FIG. 1) in accordance with the present disclosure will be described. At block 702, the hypervisor 112 may receive a SCSI I/O command from an application (e.g., app A) executing on a VM (e.g., 104-1), as described in FIG. 6 for example. In some embodiments, a vSCSI instance (e.g., 122) associated with the VM in the hypervisor 112 may receive the SCSI I/O command from the guest OS. The SCSI I/O command may include a guest physical memory address indicating a location in guest physical memory to store the data to be read in and a data count of how much data to read in.

At block 704, the hypervisor 112 (e.g., vSCSI instance) may generate an address range in the guest physical memory to store the data to be read in. In some embodiments, the address range may be provided in the I/O command. In other embodiments, the address range may be computed. For example, the address range may be computed using the guest physical memory address and the data count provided in the SCSI I/O command as follows:

beginning address=guest physical address ending address=(guest physical address+data count−1)

At block 706, the hypervisor 112 (e.g., vSCSI instance) may use the computed address range to identify a list of memory pages in physical memory 124 that span the computed address range in the guest physical memory. In some embodiments, for example, the allocation map 134 (FIG. 5A) may be used to identify the memory pages in physical memory 124 that are allocated to the VM, for example, using the VM id field 134a. Next, a list of memory pages that corresponds to the computed address range in the guest physical memory may be determined from among the identified memory pages using information provided in the address range field 134b of the allocation map 134. For example, the list constitutes memory pages whose address range in the address range field 134b falls within the computed address range. The resulting list of memory pages may be scattered across the physical memory 124 since memory pages allocated to a VM are not likely to sequential.

At block 708, the hypervisor 112 (e.g., vSCSI instance) may determine whether a memory hint is involved with the received I/O command. In some embodiments, the memory hint may be based on a service policy (e.g., 142, FIG. 1). For example, the hypervisor 112 may identify a service policy based on which VM issued the I/O command. In other embodiments, the hypervisor 112 may identify a service policy based on the application that issued the I/O command. The hypervisor 112 may access the identified service policy associated with that VM (and/or application) to determine whether the service policy includes information relating to the management of memory for that VM or application (memory management hint). If NO, then processing proceeds to block 722 to service the SCSI I/O command. Otherwise, processing may proceed to block 712.

At block 712, the hypervisor 112 (e.g., vSCSI instance) may use information (memory management hint) contained in the service policy to derive a memory management tag of a suitable kind in accordance with the present disclosure. Merely to illustrate the point, suppose the service policy includes a service policy directive such as:

MEMORY_requirement: "instant access"

The hypervisor 112 may select a memory management tag of a first kind such as KEEP, for example. If the service policy includes a service policy directive such as:

MEMORY_requirement: "don't care"

then the hypervisor 112 may select a memory management tag of a second kind such as EVICT, for example. It will be appreciated that other information in the service policy may serve as a memory management hint, and the other kinds of memory management tags may be defined. In some embodiments, the memory management hint itself may be the memory management tag.

At block 714, the hypervisor 112 (e.g., vSCSI instance) may associate each memory page in the list of memory pages produced at block 706 with the selected memory management tag. In some embodiments, for example, the memory management tag may be stored in the memory management tag fields of the tag entries 136a that correspond to the memory pages in the list of memory pages.

At block 722, the hypervisor 112 (e.g., vSCSI instance) may process or otherwise service the SCSI I/O command to read in data from the data storage system 12.

At block 724, the hypervisor 112 (e.g., vSCSI instance) may store the data that is read in into the memory pages of physical memory 124 that correspond to the computed range of addresses of the guest physical memory.

The discussion will now turn to a description of how the memory management tags may be used. As noted above, the memory manager 132 may evict memory pages allocated to deployed VMs in order to increase the number of free memory pages. Page eviction, however, can be disruptive to the VM whose memory pages have been evicted; e.g., performance may be degraded when the VM accesses an evicted memory page and must wait for the hypervisor 112 to reload the memory page.

Figure 8:
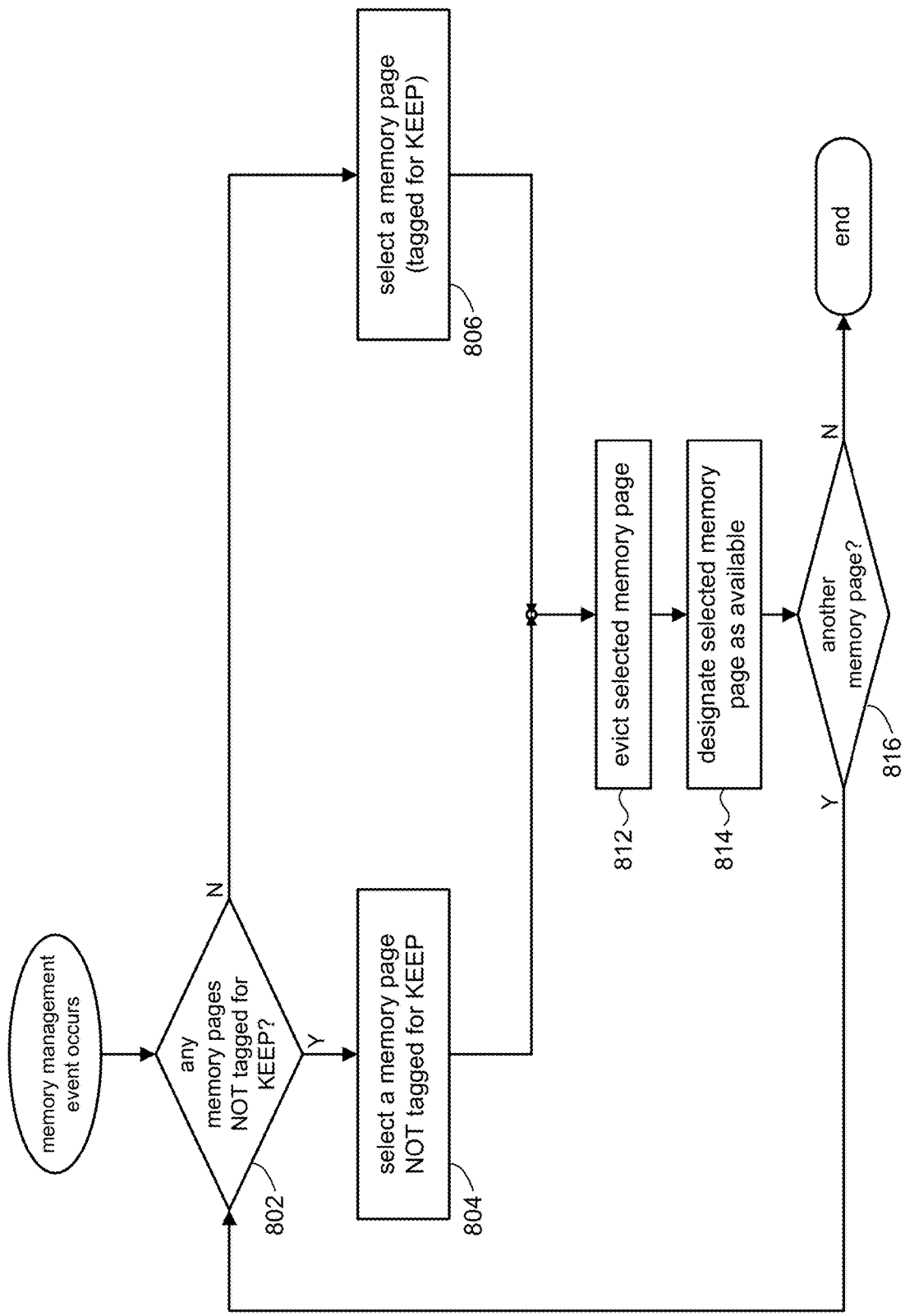
FIGS. 8, 9, and 10 highlight illustrative examples of memory page eviction in accordance with the present disclosure.

Referring to FIG. 8, in accordance with some embodiments of the present disclosure, the memory manager 132 may use the memory management tags to reduce the disruption that can arise due to eviction of memory pages. In the discussions of the particular embodiments that follow, two memory management tags are recognized, KEEP and EVICT. The memory management tags have a particular meaning that will be made clear in the processing flows described below. It will be appreciated, that in other embodiments, memory management tags having different semantics may be used to implement different page eviction policies.

The embodiment described in FIG. 8 assumes that every memory page is associated with a memory management tag of one kind or another. At block 802, in accordance with the present disclosure, the memory manager 132 may determine whether any memory pages in the physical memory are not associated with the KEEP memory management tag. This may include memory pages that are associated with memory management tags other than KEEP. In some embodiments, the memory manager 132 may use the memory management tag fields of the tag entries 136a of the tag map 136 (FIG. 5B) to make this determination. Processing in the memory manager 132 may proceed to block 804 (if YES) or to block 806 (if NO).

At block 804, in accordance with the present disclosure, the memory manager 132 may select, for eviction, a memory page only from among those memory pages in the physical memory that are not identified as KEEP. For example, KEEP may serve to indicate that the memory page should be kept in physical memory for as long as possible. Accordingly, all other memory pages may be considered candidates for eviction. In some embodiments, the memory manager 132 may simply select the memory page randomly. In other embodiments, the selection of the memory page may be based on any suitable page replacement strategy, such as a first-in-first-out approach where the oldest memory page is selected. Another known page replacement strategy selects a memory page by making predictions on which memory page will not be accessed for the longest time. Other page replacement strategies include: least recently used (LRU), not frequency used (NFU), and so on.

At block 806, in accordance with the present disclosure, the memory manager 132 may select a KEEP type memory page for eviction, but only if all the allocated memory pages in the physical memory are identified as KEEP. This allows the KEEP type memory pages to remain in physical memory as long as possible. Only when all other types of allocated memory pages have been evicted will the memory manager 132 select a KEEP type memory page for eviction. The memory manager 132 may select the KEEP type memory page randomly, or the memory manager 132 may select the memory page in accordance with a known page replacement strategy, as described above.

At block 812, the memory manager 132 may evict the selected memory page. In some embodiments, for example, the memory page may be swapped out. For example, data in the memory page may be copied to a swap area or a swap file on a local disk of the host machine 102. In some embodiments, data in the swapped out memory page may be "erased" with '0' bits or '1' bits, for example, for data security purposes.

At block 814, the memory manager 132 may de-allocate the selected memory page, for example, by clearing the bit field 1324b of corresponding entries in the allocation map 134. The memory page at this point may be deemed to be evicted, and available for subsequent allocation. When the VM makes a memory read or write on an evicted memory page, the hypervisor 112 may raise a page fault. A new memory page may be allocated from physical memory 124 and data from the swap area may be copied to the newly allocated memory page. The VM may experience a delay in getting a response to the memory operation, but should not otherwise be aware of the processing in the hypervisor 112.

At block 816, if additional memory pages need to be evicted then processing may continue at block 802; for example, in order to increase the number of un-allocated memory pages above a threshold level.

Figure 9:
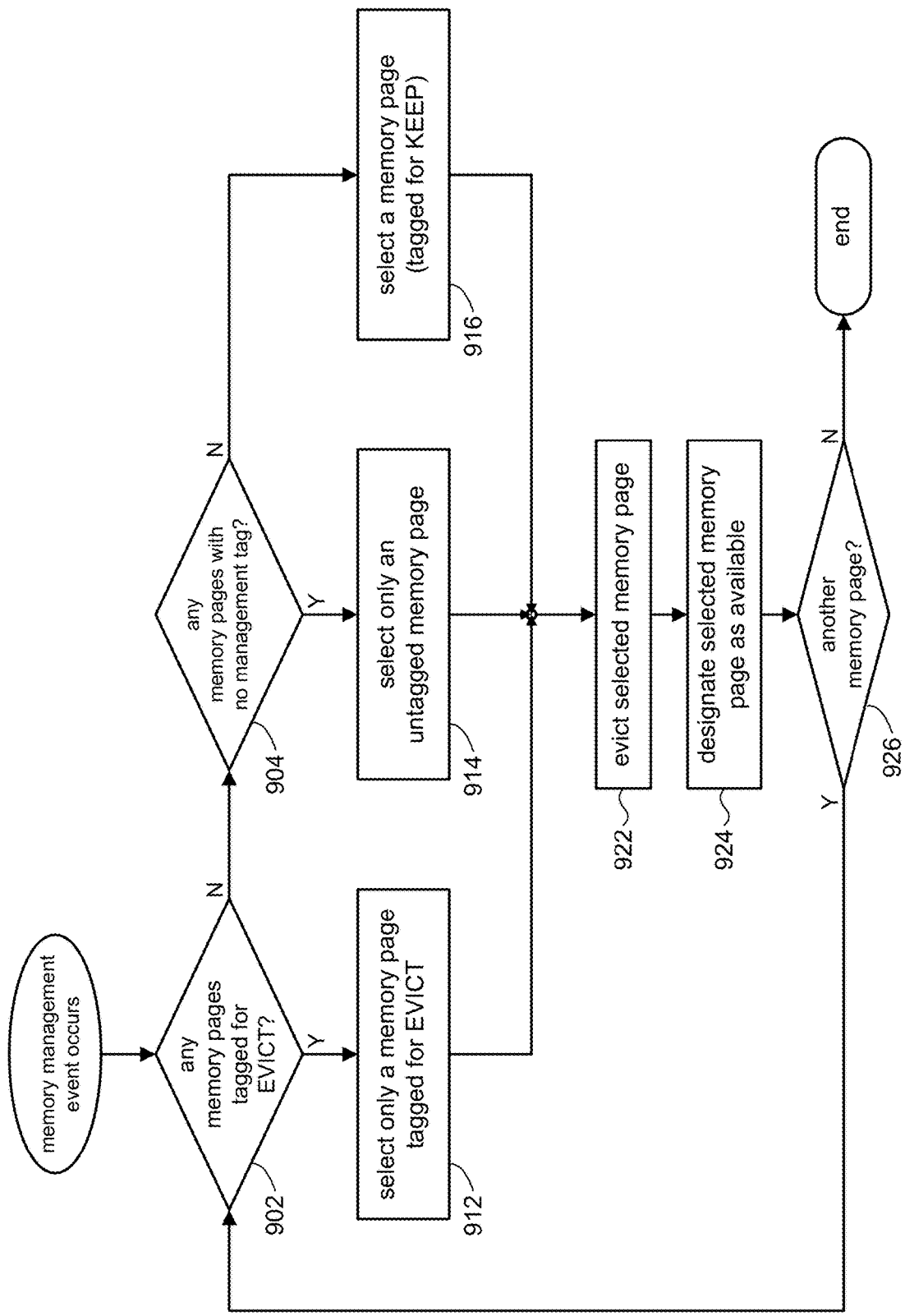

FIG. 9 shows an example of processing memory pages in accordance with the present disclosure which considers that some memory pages may not be associated with a memory management tag. This may arise, for example, if no service policy is associated with the VM or the application. As such, memory pages that receive data from the read operation above may not be associated with a memory management tag. FIG. 9 illustrates an example of how such memory pages may be processed along with memory pages that are associated with memory management tags. As explained above, KEEP type memory pages are memory pages that should remain in physical memory as long as possible. EVICT type memory pages, on the other hand, may indicate memory pages that certainly can be evicted right away.

At block 902, the memory manager 132 may determine whether any memory pages in the physical memory 124 are identified as EVICT. As explained above, EVICT type memory pages have the meaning that they may certainly be evicted. Accordingly, processing in the memory manager 132 may proceed to block 912 (if YES) or to block 904 (if NO).

At block 904, the memory manager 132 may determine whether there are any memory pages that are not associated with any kind of memory management tag (un-tagged). In some embodiments, such memory pages have precedence over EVICT type memory pages in terms of staying in physical memory, and so they may be selected for eviction only after there are no more EVICT type memory pages. However, KEEP type memory pages have preference over all types of memory page, tagged or un-tagged, and so un-tagged memory pages may be selected for eviction before KEEP type memory pages. Accordingly, processing in the memory manager 132 may proceed to block 914 (if YES) or to block 916 (if NO).

At block 912, the memory manager 132 may select a memory page only from among memory pages that are identified as EVICT. As can be seen from the flow in FIG. 9, EVICT type memory pages are the first type of memory pages to be evicted. The EVICT type memory page may be selected randomly, or in accordance with suitable page replacement strategy as described above.

At block 914, the memory manager 132 may select a memory page only from among un-tagged memory pages. As can be seen from the flow in FIG. 9, un-tagged memory pages are the second type of memory pages to be evicted, but only after all the EVICT type memory pages have been evicted. The memory page may be selected randomly, or in accordance with suitable page replacement strategy.

At block 916, the memory manager 132 may select a memory page that is identified as KEEP, but only if all the allocated memory pages in the physical memory are identified as KEEP. This gives KEEP type memory pages preferential treatment when it comes to selecting memory pages for eviction, selecting KEEP type memory pages for eviction only when all other types of memory pages (tagged or un-tagged) have been evicted. The memory manager 132 may select the KEEP type memory page randomly, or in accordance with a known page replacement strategy.

At block 922, the memory manager 132 may evict the selected memory page. In some embodiments, for example, the memory page may be swapped out. For example, data in the memory page may be copied to a swap area or a swap file on a local disk of the host machine 102. In some embodiments, data in swapped out memory page may be "erased" with '0' bits or '1' bits; for example, for data security.

At block 924, the memory manager 132 may de-allocate the swapped out memory page, for example, by clearing the bit field 1324b of corresponding entries in the allocation map 134. The memory page at this point may be deemed to be evicted.

At block 926, if additional memory pages need to be evicted then processing may continue at block 902; for example, in order to increase the number of un-allocated memory pages above a threshold level.

Figure 10:
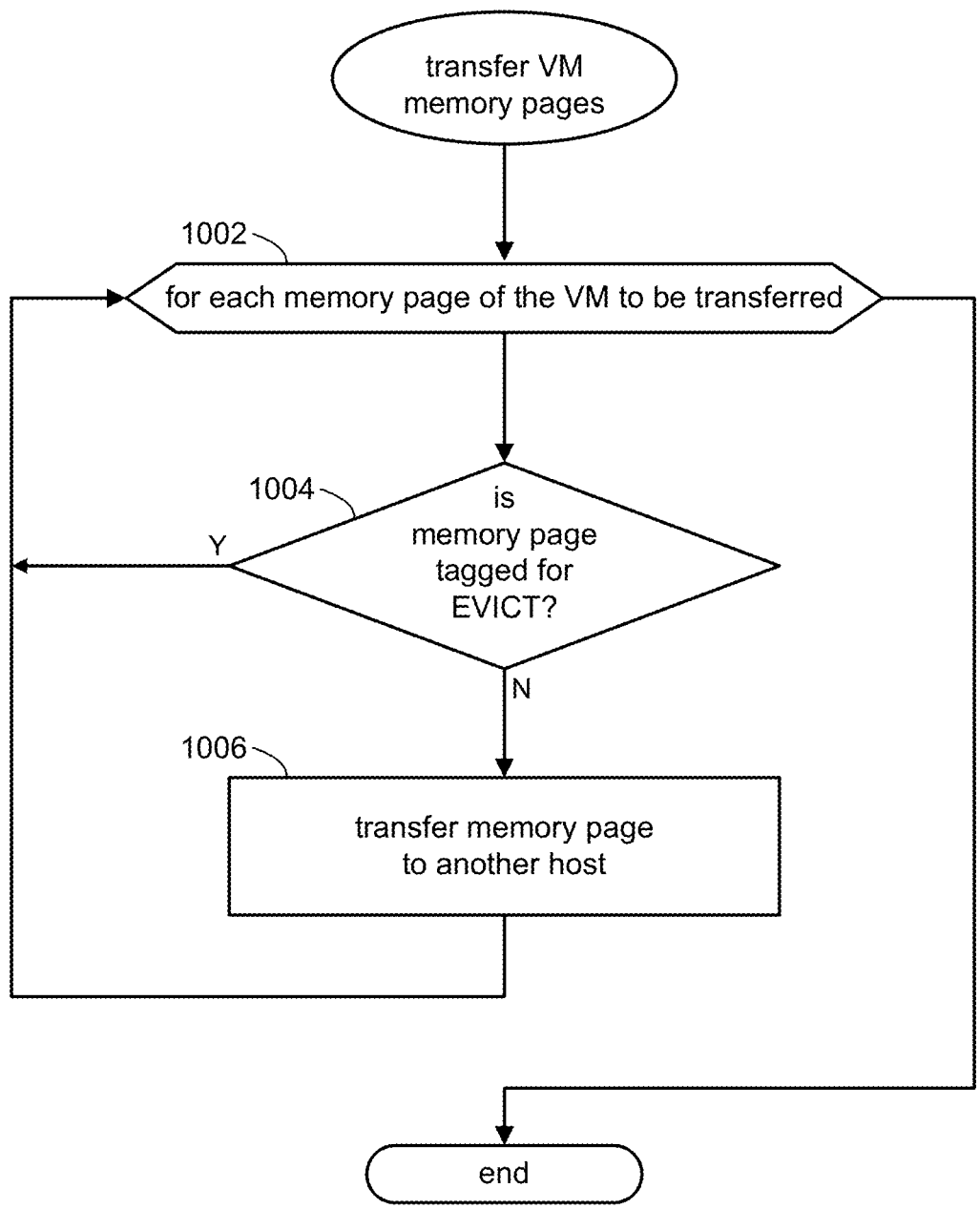

FIG. 10 illustrates an example of processing memory pages in accordance with the present disclosure in response to a VM migration directive to migrate a VM from a source host machine (e.g., 102, FIG. 1) to another host machine (the destination host, not shown). Recall that EVICT type memory pages are memory pages that can be evicted right away.

At block 1002, the memory manager 132 may identify all the memory pages allocated to the migrating VM. In some embodiments, for example, the allocation map 134 may be used to identify a list of memory pages allocated to the VM.

At block 1004, a decision may be made for each memory page. If the memory page is not associated with an EVICT memory management tag, then the memory page may be transferred to the destination host machine. If, on the other hand, the memory page is associated with the EVICT memory management tag, then the memory manager 132 may simply ignore the memory page. The memory page will not be transferred to the destination host machine; the data in the memory page may simply be erased and processing may continue with the next memory page.

At block 1006, the memory manager 132 may cause the data in the memory page to be transferred from the source host machine to the destination host machine. This may involve sending data in the memory page from the host machine over a network to the destination host machine. The network may be a local area network or a wide area network in an enterprise, or may be over a public switched network. The destination host machine may be geographically "local" (e.g., in the same room, building, city, etc.), or may be geographically "distant" (e.g., across the country, in a different country, etc.).

A conventional migration of a VM typically involves transferring all of memory from the host machine to the destination host machine, in order to preserve the data state of all the running applications. Migration of a VM in accordance with the present disclosure can also preserve the data state of running applications. However, some applications may not care about their data state. Those applications may identified in a service policy (e.g., 142, FIG. 1) and their memory appropriately "tagged" so that the migration process can omit transferring such tagged memory. This preserves the data state in the migrated VM for applications that need their data state preserved, while at the same time reducing the amount of data that needs to be transferred for migration. Reducing the volume of data for migration can be relevant for long haul migrations, when data bandwidth is limited, in highly dynamic environments when VM migration can frequently occur, and so on.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments may relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for virtual memory management in a computer system, the method comprising:

allocating memory pages from a physical memory of the computer system to a plurality of virtual machines executing on the computer system;

associating memory pages allocated to a virtual machine with memory management tags, the memory management tags including at least memory management tags of a first kind and memory management tags of a second kind, the associating including using a service policy to select a memory management tag of the first kind or the second kind and associating one or more allocated memory pages with the selected memory management tag, the service policy specifying a performance level or a capability of the virtual machine that the one or more allocated memory pages are allocated to;

in response to a memory management event, identifying one or more memory pages to be evicted from the physical memory based on whether the memory pages are associated with a memory management tag of the first kind or a memory management tag of the second kind;

evicting the identified memory pages; and designating the evicted memory pages as un-allocated memory pages for subsequent allocation to the applications executing on the computing system.

2. The method of claim 1, further comprising selecting a memory management tag of the first kind or the second kind in response to the computer system receiving an I/O command from an application executing on the computer system and associating memory pages allocated to the application with the selected memory management tag.

3. The method of claim 1, wherein the computer system is a host machine in a virtualization system.

4. The method of claim 1, wherein memory pages associated with memory management tags of the first kind are evicted only after all memory pages associated with memory management tags of the second kind have been evicted.

5. The method of claim 1, wherein when the physical memory contains one or more memory pages associated with memory management tags of the second kind, then identifying one or more memory pages for eviction includes selecting memory pages only from among memory pages associated with memory management tags of the second kind.

6. The method of claim 5, wherein the identifying includes selecting one or more memory pages from among memory pages associated with memory management tags of the second kind in random fashion or in accordance with a page replacement strategy.

7. The method of claim 1, wherein memory pages associated with memory management tags of the first kind are selected for eviction only when the physical memory contains only memory pages associated with memory management tags of the first kind.

8. The method of claim 1, wherein evicting a memory page from the physical memory comprises copying data in the memory page to a swap area in the computer system.

9. The method of claim 1, wherein the memory management event occurs when the number of un-allocated memory pages in the physical memory is less than a predetermined threshold value.

10. The method of claim 1, wherein the applications include first and second applications that execute on separate virtual machines deployed on the host machine.

11. The method of claim 1, further comprising transferring a virtual machine deployed on the host machine to a destination host machine, including:

copying from the host machine to the destination host machine data that is stored only in memory pages allocated to the virtual machine that are not associated with memory management tags of the second kind; and designating all memory pages allocated to the virtual machine as un-allocated memory pages for subsequent allocation to other virtual machines deployed on the host machine.

12. A non-transitory computer-readable storage medium having stored thereon instructions for controlling a computer system to:

allocate memory pages from a physical memory of the computer system to a plurality of virtual machines executing on the computer system;

associate memory pages allocated to a virtual machine with memory management tags, the memory management tags including at least memory management tags of a first kind and memory management tags of a second kind, wherein the instructions further control the computer system to select a memory management tag of the first kind or the second kind using a service policy and to associate one or more allocated memory pages with the selected memory management tag, the service policy specifying a performance level or a capability of the virtual machine that the one or more allocated memory pages are allocated to;

in response to a memory management event, identify one or more memory pages to be evicted from the physical memory based on whether the memory pages are associated with a memory management tag of the first kind or a memory management tag of the second kind;

evict the identified memory pages; and designate the evicted memory pages as un-allocated memory pages for subsequent allocation to applications executing on the computing system.

13. The non-transitory computer-readable storage medium of claim 12, further including instructions for controlling the computer system to select a memory management tag of the first kind or the second kind in response to the computer system receiving an I/O command from an application executing on the computer system and associating memory pages allocated to the application with the selected memory management tag.

14. The non-transitory computer-readable storage medium of claim 12, further including instructions for controlling the computer system to copy data in a given memory page to a swap area in the computer system in order to evict the given memory page.

15. The non-transitory computer-readable storage medium of claim 12, wherein the computer system is a host machine in a virtualization system, wherein memory pages that comprise the physical memory are allocated to virtual machines deployed on the host machine, the non-transitory computer-readable storage medium further including instructions for controlling the computer system to transfer a virtual machine deployed on the host machine to a destination host machine, including:

copying, from the host machine to the destination host machine, data that is stored only in memory pages allocated to the virtual machine that are not associated with memory management tags of the second kind; and designating all memory pages allocated to the virtual machine as un-allocated memory pages for subsequent allocation to other virtual machines deployed on the host machine.

16. A computer system comprising:

a data processing component;

a physical memory, the physical memory organized into a plurality of memory pages; and local data storage having stored thereon computer executable program code, which when executed by the data processing component causes the data processing component to:

allocate memory pages from a physical memory of the computer system to a plurality of virtual machines executing on the computer system;

associate memory pages allocated to a virtual machine with memory management tags, the memory management tags including at least memory management tags of a first kind and memory management tags of a second kind, wherein the computer executable program code further cause the data processing component to select a memory management tag of the first kind or the second kind using a service policy and to associate one or more allocated memory pages with the selected memory management tag, the service policy specifying a performance level or a capability of the virtual machine that the one or more allocated memory pages are allocated to;

in response to a memory management event, identify one or more memory pages to be evicted from the physical memory based on whether the memory pages are associated with a memory management tag of the first kind or a memory management tag of the second kind;

evict the identified memory pages; and designate the evicted memory pages as un-allocated memory pages for subsequent allocation to applications executing on the computing system.

17. The computer system of claim 16, wherein memory pages associated with memory management tags of the first kind are evicted only after all memory pages associated with memory management tags of the second kind have been evicted.

* * * * *